United States Patent [19]
Kress et al.

[11] Patent Number: 5,149,233
[45] Date of Patent: Sep. 22, 1992

[54] REAMER

[75] Inventors: Dieter Kress, Aalen; Friedrich Häberle, Lauchheim, both of Fed. Rep. of Germany

[73] Assignee: Mapal, Fed. Rep. of Germany

[21] Appl. No.: 454,967

[22] Filed: Dec. 22, 1989

[30] Foreign Application Priority Data

Feb. 8, 1989 [DE] Fed. Rep. of Germany ....... 3903655

[51] Int. Cl.$^5$ ............................................. B23B 27/16
[52] U.S. Cl. .................................. 408/199; 408/713; 408/233
[58] Field of Search ............... 408/199, 200, 233, 197, 408/179, 185, 705, 713, 181; 407/46, 47, 49, 45, 48, 77, 107

[56] References Cited

U.S. PATENT DOCUMENTS

| | | | |
|---|---|---|---|
| 3,154,974 | 11/1964 | Greenleaf | 408/240 |
| 4,125,342 | 11/1978 | Kress | 408/233 |
| 4,353,669 | 10/1982 | Striegl | 408/185 |
| 4,850,757 | 7/1989 | Stashhu | 408/199 X |

FOREIGN PATENT DOCUMENTS

| | | | |
|---|---|---|---|
| 1502869 | 6/1969 | Fed. Rep. of Germany | 408/199 |
| 1922131 | 10/1970 | Fed. Rep. of Germany | 408/197 |
| 2502183 | 7/1976 | Fed. Rep. of Germany | 408/185 |
| 3201508 | 4/1983 | Fed. Rep. of Germany | 408/197 |
| 2110129 | 6/1983 | United Kingdom | 408/199 |

Primary Examiner—Larry I. Schwartz
Assistant Examiner—Robert Schultz
Attorney, Agent, or Firm—Staas & Halsey

[57] ABSTRACT

A reamer with at least one cutter plate that is held by at least one clamping jaw located in a recess in the head of the reamer and having an opening for a clamping screw is proposed, said reamer being distinguished by the fact that the clamping jaw (5) is shaped essentially as a triangle when viewed from the top, that the opening (23) for the clamping screw (7) is located in a corner of the triangle, and that the lateral surfaces of the clamping jaw (5) starting from this corner form guide surfaces (13, 15), which are provided with contact surfaces in the recess (9) in the head of the reamer. By using this clamping jaw, the cutter plate can be optimally clamped and aligned without weakening the main body of the reamer. Both the flank and lateral surfaces of the clamping jaw interact with the stop surfaces in a recess (9) in such a manner that optimal diversion of the clamping forces in the main body of the reamer also takes place.

16 Claims, 3 Drawing Sheets

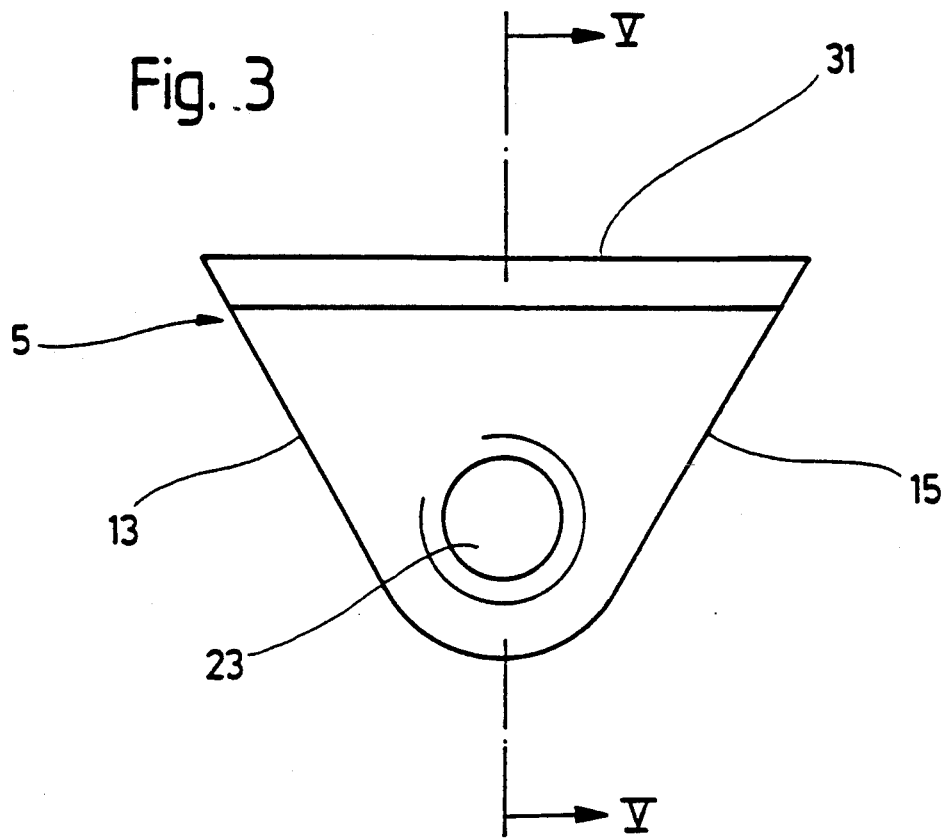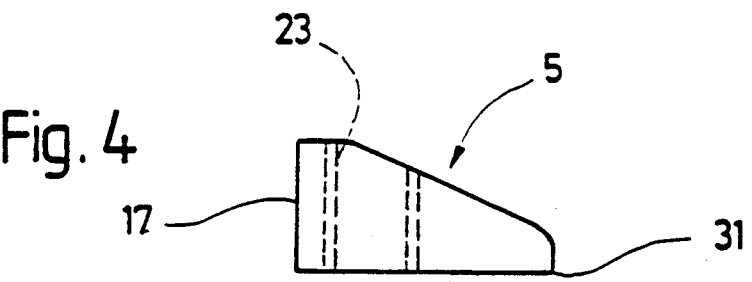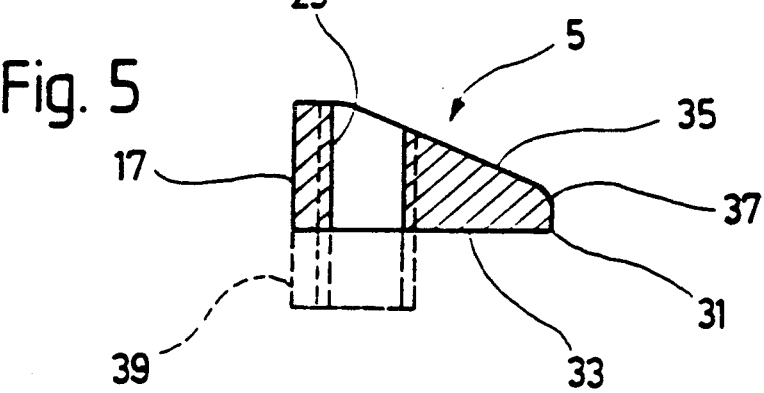

REAMER

BACKGROUND OF THE INVENTION

The invention relates to a reamer having at least one cutter plate.

Cutter plates of reamers are made from a very hard but brittle material. Thus, it is extremely important that the clamping jaw is aligned relative to a cutter plate in such a manner that no point loading occurs during clamping which could destroy the cutter plate. Moreover, it is important that the cutting blade is aligned very exactly, in particular, when the walls of borings are finish-machined. In addition, the position of the clamping jaw relative to the cutter plate must be maintained very exactly.

With a known reamer (DE-PS 34 06 035 [German Patent]), the alignment of the clamping jaw relative to the cutter plate is accomplished by providing the clamping jaw with two areas offset from each other, whereby one area counteracts the horizontal swing of the clamping jaw during clamping, while the other incorporates the clamping screw.

This reamer has the disadvantage that the accuracy of the alignment is not adequate for numerous applications where precision machining of the walls of borings is the goal. Moreover, the clamping jaw is relatively large because of the two separate areas. As a result, the body of the reamer is weakened by the recess incorporating the clamping jaw, a matter of great importance, especially, when machining borings with very small diameters, i.e., with small reamers.

SUMMARY OF THE INVENTION

It is, therefore, an object of the invention to provide a reamer having at least one cutter plate that makes it possible to optimally clamp and align the cutter plate without weakening the main body of the reamer.

According to the present invention, virtue of the special design of the clamping jaw as a triangle, it is possible to utilize the lateral surfaces of the clamping jaw as guide surfaces, said lateral surfaces originating at the corner in which the clamping screw of the clamping jaw is located. Extremely precise alignment of the clamping jaw is thereby possible with a very small assembly. Both the flank and lateral surfaces of the clamping jaw interact with the corresponding contact and stop surfaces provided in a recess in the main body of the reamer in which the clamping jaw is accommodated.

In a preferred embodiment of the reamer, there is a transition of the lateral surfaces of the clamping jaw into a circular-shaped wall area. Because of this rounding, the clamping jaw can follow a swivelling movement caused by the lateral walls, which act as guide surfaces. Consequently, extremely exact alignment of the clamping jaw is ensured.

Therefore, another embodiment of the reamer is especially preferred because the underside of the clamping jaw, which clamps the cutter plate, is shaped essentially as a plane surface. With this type of design of the clamping jaw, the recess in the main body of the reamer that accepts the clamping jaw is especially flat. This means that weakening of the reamer is kept to a minimum.

Finally, an embodiment of the reamer is especially preferred in which the thread provided in the clamping jaw that serves to accept a clamping screw continues on in a cylindrical pin that is concentric to the opening for the clamping screw and is provided with an internal thread. It originates on the underside of the clamping jaw. By lengthening the thread, especially high clamping forces can be absorbed so that the exact alignment of the cutter plate, which is held by the clamping jaw, can be optimally maintained. The diameter of the boring provided in the main body of the reamer for the cylindrical pin of the clamping jaw is somewhat larger than the diameter of this pin. In this way, impairment of the alignment caused by the lateral surfaces of the gripping or clamping jaw is precluded.

Further embodiments and advantages of the reamer will become apparent from the following detailed description and drawings.

BRIEF DESCRIPTION OF THE DRAWINGS

FIG. 3 is a plan view on the topside of a clamping jaw;

FIG. 4 is a side view of a clamping jaw and

FIG. 5 is a cross-sectional view along Line V—V of FIG. 3.

DETAILED DESCRIPTION OF THE PREFERRED EMBODIMENTS

Figure 1:
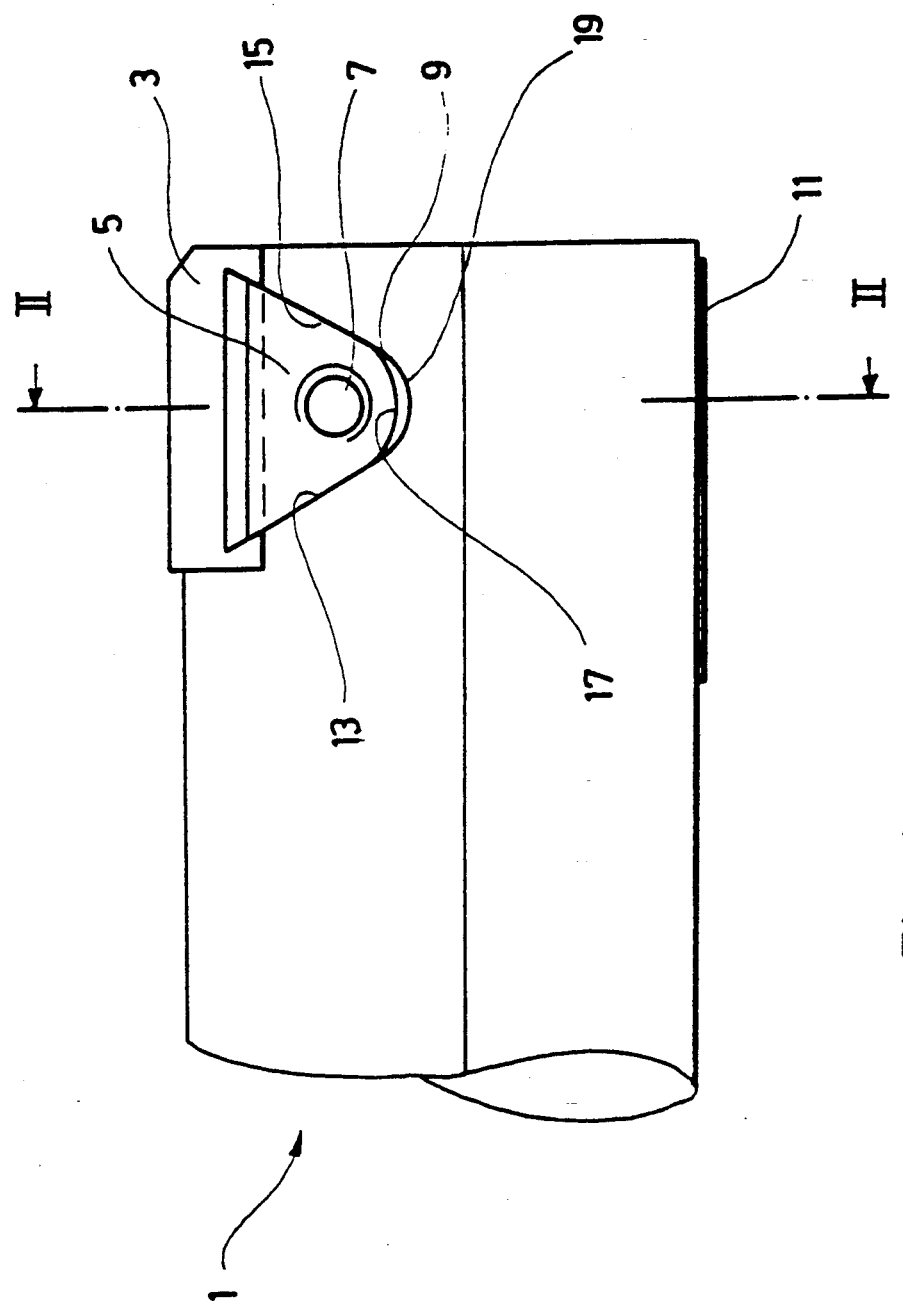
FIG. 1 is a side view of the front part of a reamer according to the present invention with one of the cutter plates held by a clamping jaw.

FIG. 1 shows a side view of the front part or head of a reamer 1. A cutter plate 3 is held by a gripping or clamping jaw 5. The clamping jaw is tightened by a clamping screw 7 in the main body of the reamer 1.

The reamer 1 is provided with a recess 9 whose contours correspond approximately to those of the clamping jaw 5 so that the clamping jaw lies in the recess.

On the circumference of the reamer 1, a first guide strip 11 is provided opposite the cutter plate 3.

In FIG. 1, a top view of the clamping jaw 5 is shown. It is obvious that it is shaped essentially as a triangle whereby the clamping screw 7 is located in one corner of the triangle. The side or edge of the clamping jaw 5 lying opposite this corner rests on the cutter plate 3.

The side surfaces of the clamping jaw 5, which originate from the corner where the clamping screw is provided, are designed as guide surfaces 13 and 15 diverging at a first angle, a, which interact with the boundary surfaces of the recess 9 diverging at a second angle, in the main body of the reamer 1. The first and second angles of the side surfaces and boundary surfaces being substantially the same to facilitate the proper positioning of the clamping jaw 5. In this case, the walls of the recess 9 act as contact surfaces for the guide surfaces 13 and 15.

In the area of the corner of the clamping jaw 5 in which the clamping screw 7 is provided, there is a transition of the guide surfaces 13 and 15 into a circular-shaped wall area 17. There is also a transition of the boundary walls of the recess 9, which function as contact or stop surfaces for the guide surfaces 13 and 15, into a circular-shaped wall area 19.

It is obvious from the diagram that the clamping jaw 5, when fastened in the reamer 1 with its guide surfaces 13 and 15, rests on the corresponding boundary walls of the recess 9, which serve as stop surfaces. Through the interaction of these surfaces, the clamping jaw is very exactly aligned in the body of the reamer 1. Owing to the size of the guide surfaces 13 and 15, it is ensured that the alignment of the clamping jaw is maintained even with high clamping forces. By exactly adjusting the clamping jaw 5, very exact holding or gripping of the cutter plate 3 is ensured. This is of great importance, especially with finish-machining borings, where a high surface finish and exact dimensional accuracy should be achieved.

The guide surfaces 13 and 15 also serve as surfaces to resist and absorb the forces that arise when the clamping jaw 5 is tightened. Further details concerning this are given below in the explanations of FIG. 2.

In the embodiment example shown, the guide surfaces 13 and 15 of the clamping jaw 5 include an angle of approximately 60°. Because of this large opening angle, the width of the clamping surface acting on the cutter plate is large. By changing the opening angle, the clamping jaw can be adapted to various cutter plate sizes and/or lengths.

Owing to the width of the clamping surface, optimal distribution of the clamping forces is ensured and point loading of the cutter plate, which can cause damage, is avoided. At the same time, the above-mentioned very exact clamping results even when the cutter plates are relatively long.

Finally, because of the great width of the clamping jaw, the cutter plate can be nearly completely covered, even in the area of the chamfer. In this way, not only can optimal clamping can be achieved, but also especially good chip flow. The latter is achieved because there are no edges in the area where the chips are discharged on which the chips could pile up. Because virtually all of the chips flow onto the clamping jaw, the main body of the reamer is optimally protected against wear.

Figure 2:
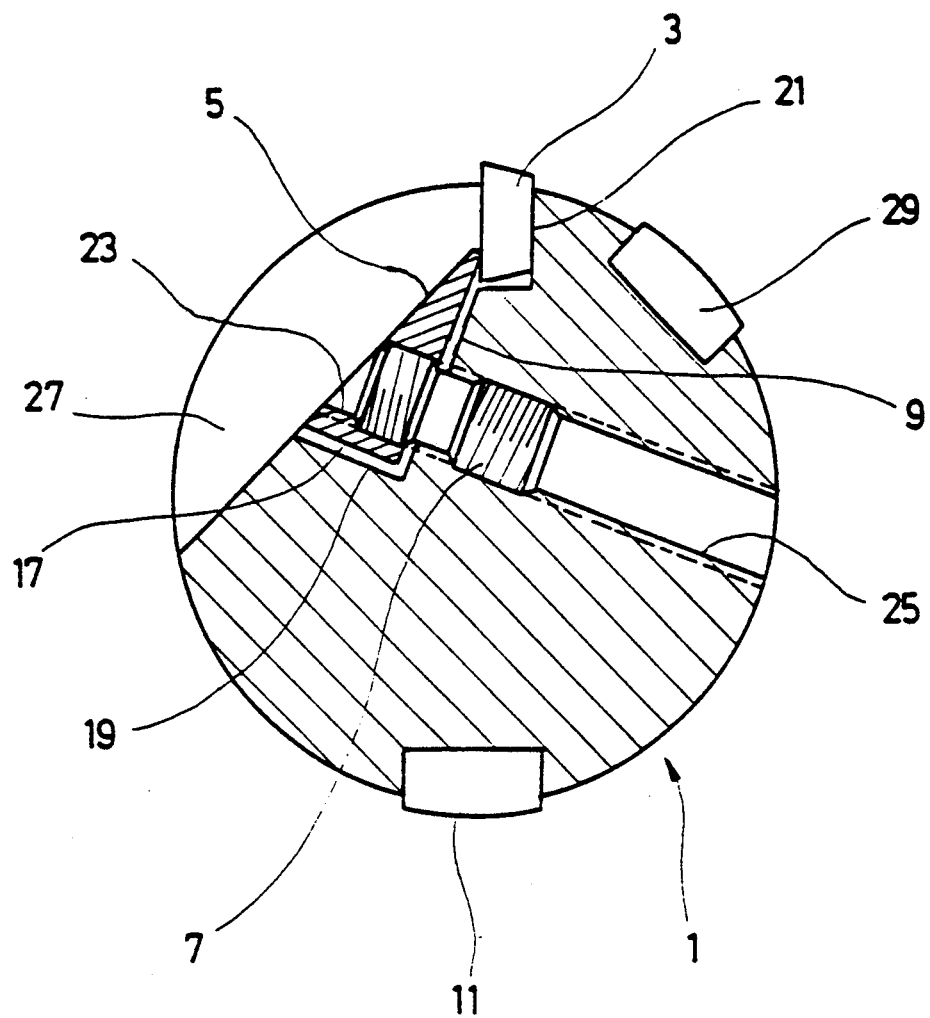
FIG. 2 is a cross-sectional view through the reamer along Line II—II of FIG. 1.

FIG. 2 shows a section along Line II—II through the reamer 1 shown in FIG. 1. Because the same parts are identified with the same reference symbols, a detailed description of each part can be omitted.

The cutter plate 3 is located in a suitable recess 21 in the main body of the reamer 1.

The edge of the clamping jaw 5 opposite the clamping screw 7 presses on the front side of the cutter plate 3, i.e., on the cutter lip. By means of this clamping force, the cutter plate 3 is pressed and held with its backside against a shoulder of the recess 21. If the cutter plate 3 is designed as an interchangeable plate, the contour of the locating surface provided in the recess 21 can be adapted for the cutting edge of the cutter plate so that damage to the cutting edge is precluded.

From the transverse section, it can be seen that the recess 9 in the main body of the reamer 1 is adapted to the contour of the cutter plate. This means that the depth of the recess in the area of the clamping screw 7 is greater than in the area of the front side of the clamping jaw 5 that is turned toward the cutter plate 3. The clamping jaw 5 is entirely countersunk in the main body of the reamer so that the surface of the clamping jaw is flush with the adjacent surface of the reamer bordering the chip space 27.

The clamping screw 7 is screwed into an internally threaded opening 23 in the clamping jaw 5. A through hole 25 with internal threads is located in the main body of the reamer 1 and runs concentrically to opening 23 in the cutter plate 5. The clamping screw 7 is provided with two threaded areas, one being left-handed and the other right-handed. One of the threaded areas mates with the internal thread in the boring 25 and the other mates with the internal thread provided in opening 23.

The circular-shaped wall area 17 of the clamping jaw 5, which faces the cutter plate 3, has a smaller radius of curvature than the circular-shaped wall area 19 of the recess 9 in the main body of the reamer 1. In this area, the clamping jaw does not come in contact with the recess 9. Consequently, the alignment and adjustment of the clamping jaw effected by the guide surfaces 13 and 15 is not impaired by this area. In addition, it is ensured that the forces arising when the clamping jaw is tightened are diverted or carried exclusively via the guide surfaces 13 and 15 in the main body of the reamer 1.

As seen from the corner in which the clamping screw 7 is located, the thickness of the clamping jaw 5 decreases in the direction towards the edge of the clamping jaw resting on the cutter plate 3. In other words, the cross-section of the clamping jaw 5 is essentially triangular. Because of this shape of the clamping jaw, the chips that form when machining the wall of a boring can flow unhindered into the chip space 27.

When machining a boring, the reamer 1 is supported not only on the first guide strip 11 located opposite to the cutter plate 3, but also on a second guide strip 29 located after the first guide strip as viewed in the direction of rotation. The direction of rotation of the reamer is indicated by an arrow.

To better depict the clamping jaw 5, an enlarged view is shown in FIGS. 3 to 5. The same parts are marked with the same reference symbols.

The essentially triangular shape of the clamping jaw 5 can be clearly recognized from the diagram in FIG. 3. In one corner of the triangle, the opening 23 with an internal thread in which the clamping screw 7 can engage is recognizable. The edge 31 of the clamping jaw 5 opposite the opening 23 rests on the cutter plate 3 to be held. The lateral surfaces originating from this edge 31 act as guide surfaces 13 and 15. They interact with the corresponding contact surfaces of the recess 9 in the main body of the reamer 1 so that alignment in the body of the reamer 1 when the clamping jaw is tightened is very exact.

The position of the clamping jaw 5 does not change when machining the walls of a boring nor when making a radial adjustment of the cutter plate 3. By exactly adjusting the clamping jaw, a very exact radial setting of the cutter plate 3 is also possible. The result is optimal alignment of the cutter plate in the head of the reamer 1. The regulating units for making radial settings of cutter plate are well-known and, consequently, not shown in the drawing.

The clamping jaw 5 can also be designed asymmetrically. By changing the opening angle of the side walls of the clamping jaw, the cutter plate 3 can be virtually entirely spanned by the edge 31 of the clamping jaw. Especially in the area of the cutting edge, i.e., in the front area (as seen in the feed direction) of the cutter plate, optimal clamping can be achieved. In addition, the wear of the main body of the reamer is minimal because the chips always flow onto the clamping jaw. Because there are no edges in the area of the chip flow, chip buildups are reduced to a minimum.

From the side view of FIG. 4, it is evident that the thickness of the clamping jaw 5, as seen from the corner in which the opening 23 is provided decreases in the direction towards the edge 31. In other words, the cross-section of the clamping jaw is essentially triangular. As is evident from FIG. 2, the shape of the clamping jaw 5 corresponds to that of the recess 9 in the body of the reamer 1 so that the clamping jaw, when mounted, is virtually completely countersunk in the reamer.

In the area of the circular-shaped wall 17, the length of the internal threads in the opening 23 corresponds to the thickness of the clamping jaw 5. This results in very high strength in this area so that strong clamping forces can be applied.

Because the underside 33 of the clamping jaw 5 is shaped as a plane surface, the mounting on the clamping surface of the cutter plate 3 or on the cutter lip is exact. The lateral surfaces of the clamping jaws, which act as guide surfaces 13 and 15, are perpendicular to the underside 33, just like the centerline of the opening 23.

In the following, it will be explained once again how the clamping forces of the clamping jaw 5 are transferred to the cutter plate 3 or diverted from the reamer 1.

The clamping jaw 5 rests with the edge 31 on the cutter plate 3. When the clamping screw 7 is tightened, the clamping jaw presses on the cutter lip so that the cutter plate 3 is pressed against the back wall of the recess 21 in the main body of the reamer 1.

When the clamping screw 7 is tightened, the clamping jaw 5 attempts to make a rotating motion, whereby the axis of rotation of this motion coincides with the line of contact between the clamping jaw and the cutter plate. Through this rotating motion, the lateral surfaces of the clamping jaw, which act as guide surfaces 13 and 15, are set against the associated boundary walls of the recess 9, which act as contact surfaces. By this means, the alignment of the clamping jaw takes place. The goal of the alignment is to align the edge 31 of the clamping jaw as parallel as possible to the minor cutting edge of the cutter plate 3. The minor cutting edge is the cutting edge of the cutter plate that is inclined contrary to the feed direction (indicated by an arrow in FIG. 1) of the reamer 1. However, the inclination of 1 μm for each 1 mm is so small that it cannot be seen in the diagram shown in FIG. 1.

When the triangular clamping jaw is pressed into the similarly shaped triangular recess 9 of the reamer 1 as the clamping screw is tightened, the clamping forces are diverted via the guide surfaces 13 and 15 into the boundary walls of the recess 9, which act as a surface to resist the forces. The clamping forces are thereby transmitted virtually perpendicularly into the boundary walls, which deform essentially parallel to the surface of the chip space. Because of the various radii of curvature of the circular-shaped wall areas 17 and 19 of the clamping jaw and the recess, no transfer of forces takes place because there is no contact between the clamping jaw and the recess 9. In FIGS. 1 and 2, a gap is clearly evident in this area. With conventional reamers, support to absorb the clamping forces takes place directly in the rear area of the clamping jaw. Especially with reamers having a very small diameter, deformation of the reamer body frequently occur because of the clamping forces. It is evident from FIG. 2 that this deformation occurs especially in the area between the backside of the clamping jaw and the circumferential line of the reamer.

FIG. 5 shows a section through the clamping jaw 5 along line V—V, which is drawn in FIG. 3.

From this diagram, it is once again evident that the underside 33 of the clamping jaw is flat and that the topside 35 is inclined towards this plane, whereby an angle of approximately 5° to approximately 60° is included. An angle equal to approximately 20° is preferred. In this way, the cross-section of the clamping jaw 5 is triangular. Owing to the height of the circular-shaped wall area 17, high clamping forces can be absorbed via the internal thread of the opening 23. In the area of the edge 31 resting on the cutter plate 3, a chamfer 37 is provided.

In the transverse section, a cylindrical projection 39 is indicated, which runs concentrically to the opening 23 and originates on the underside 33 of the clamping jaw 5 and is provided with an internal thread. By this means, a lengthening of the thread can be achieved for the clamping screw 7 so that the clamping forces can be increased still further. The outside diameter of the cylindrical projection 39 is smaller than the inside diameter of the boring provided in the main body of the reamer 1, which acts as a receiver for the cylindrical projection. By this means, impairment of the alignment of the clamping jaw caused by the guide surfaces 13 and 15 is precluded.

Optimum alignment of the clamping jaw is aided by the very large size of the guide surfaces 13 and 15. They extend over the entire height of the clamping jaw and reach practically over the entire edge length of the clamping jaw. Because of these large guide surfaces and despite the small overall size of the clamping jaw, the result is very large guide forces for maintaining the clamping jaw in the desired position. Owing to the opening angle of 60°, for example, of the guide surfaces 13 and 15 originating from the edge 31, the length of the edge 31 is large and, thus, the contact surface on the cutter plate 3 is large. By this means, very large cutter plates can also be held securely and precisely by this clamping jaw.

Without difficulty, it is possible to provide at least two clamping jaws of the above-described type for very large cutter plates.

Because the underside 33 of the clamping jaw 5 according to FIG. 4 is shaped as a plane surface, the recess 9 in the main body of the reamer 1 is very flat. As a result, weakening of the reamer is reduced to a minimum. By this means, the clamping jaw described here can also be provided for reamers intended for machining borings having very small diameters.

What is claimed is:

1. A reamer comprising:
   a head having a rotation axis and an opening for a clamping screw and a recess, the recess including a cutter plate mounting portion having a shoulder and a clamping jaw mounting portion having a first apex and two lateral boundary surfaces diverging from the first apex at an angle $\beta$;
   a clamping jaw mounted in the clamping jaw mounting portion of the recess of the head and having a mounting hole aligned with the head opening;
   a clamping screw threadedly engaging the mounting hole of the clamping jaw and the opening of the head;
   at least one cutter plate having a cutting edge and being held against the shoulder of the cutter plate mounting portion of the recess by the clamping jaw, wherein the clamping jaw (5) is formed in a triangular plan shape with a second apex, the clamping jaw having lateral side surfaces diverging from the second apex at an angle $\alpha$ which is substantially equal to the angle of $\beta$, and a longitudinal holding edge joining the two lateral side surfaces, the longitudinal holding edge of the clamping jaw being substantially parallel to and impinging against the at least one cutter plate, the mounting hole (23) being located near the second apex of the clamping jaw, and the two lateral side surfaces of the clamping jaw (5) forming guide surfaces (13, 15), the guide surfaces of the clamping jaw contacting the lateral boundary surfaces of the recess to achieve in a correct alignment of the clamping jaw mounting portion of the clamping jaw with respect to the cutter plate; and first and second guide strips mounted on said head, wherein said first guide strip is mounted at a first location adjacent to and circumferentially behind said at least one cutter plate and said second guide strip is mounted at a second location diametrically opposite said at least one cutter plate.

2. A reamer according to claim 1 wherein the guide surfaces (13, 15) of the clamping jaw (5) converge into a circular-shaped wall area (17).

3. A reamer according to claim 2, wherein the two lateral boundary surfaces of the recess converge into a circular-shaped wall area (19).

4. A reamer according to claim 3, wherein the radius of the wall area (19) of the clamping jaw mounting portion of the recess (9) in the reamer (11) is larger than that of the wall area (17) of the clamping jaw (5).

5. A reamer according to claim 1 wherein the clamping jaw has a substantially planar underside surface (33) opposing the cutter plate of the clamping jaw (5), and wherein the underside surface is substantially perpendicular to the clamping screw.

6. A reamer according to claim 5, further comprising a cylindrical projection (39) concentric to the clamping jaw opening (23) located on the underside (33) surface of the clamping jaw (5), said cylindrical projection being provided with a thread on its inside for engaging the clamping screw (7).

7. A reamer according to claim 1, wherein the clamping jaw (5) decreases in thickness starting from the apex in the direction towards the longitudinal holding edge.

8. A reamer according to claim 2 wherein the clamping jaw has a substantially planar underside surface (33) opposing the cutter plate of the clamping jaw (5), wherein the underside surface is substantially perpendicular to the clamping screw.

9. A reamer according to claim 3 wherein the clamping jaw has a substantially planar underside surface (33) opposing the cutter plate of the clamping jaw (5), wherein the underside surface is substantially perpendicular to the clamping screw.

10. A reamer according to claim 4 wherein the clamping jaw has a substantially planar underside surface (33) opposing the cutter plate of the clamping jaw (5), wherein the underside surface is substantially perpendicular to the clamping screw.

11. A reamer according to claim 2, wherein the clamping jaw (5) decreases in thickness starting from the apex in the direction towards the longitudinal holding edge.

12. A reamer according to claim 3, wherein the clamping jaw (5) decreases in thickness starting from the apex in the direction towards the longitudinal holding edge.

13. A reamer according to claim 4, wherein the clamping jaw (5) decreases in thickness starting from the apex in the direction towards the longitudinal holding edge.

14. A reamer according to claim 5, wherein the clamping jaw (5) decreases in thickness starting from the apex in the direction towards the longitudinal holding edge.

15. A reamer according to claim 6, wherein the clamping jaw (5) decreases in thickness starting from the apex in the direction towards the longitudinal holding edge.

16. A reamer according to claim 1, wherein the lateral boundary surfaces of the recess and the lateral side surfaces of the clamping jaw are flat, linear load bearing surfaces.

* * * * *